United States Patent [19]

Mathues

[11] 4,061,429
[45] Dec. 6, 1977

[54] WHEEL BRAKE ASSEMBLY

[75] Inventor: Thomas P. Mathues, Miamisburg, Ohio

[73] Assignee: General Motors Corporation, Detroit, Mich.

[21] Appl. No.: 735,454

[22] Filed: Oct. 26, 1976

[51] Int. Cl.$^2$ .............................................. F16D 65/02
[52] U.S. Cl. .................................. 188/206 A; 188/341
[58] Field of Search ................... 188/18 R, 78, 206 A, 188/206 R, 331, 341

[56] References Cited

U.S. PATENT DOCUMENTS

| | | | |
|---|---|---|---|
| 3,200,908 | 8/1965 | Budd et al. | 188/206 R X |
| 3,385,405 | 5/1968 | Cullen | 188/206 A |
| 3,576,237 | 4/1971 | DuBuc | 188/206 A |

*Primary Examiner*—Duane A. Reger
*Attorney, Agent, or Firm*—D. D. McGraw

[57] ABSTRACT

A drum brake assembly for a vehicle wheel includes an axle housing flange extending upwardly and provided with an opening through which the wheel cylinder hydraulic line input and bleed fittings extend. A thin wall backing plate is secured to the flange and supports the wheel cylinder but does not take brake torque. The anchor pin is assembled through the backing plate directly to the flange, also fastening the backing plate to the flange at this point. This provides a precise anchor pin location with the anchor pin also acting as a braking unit mounting bolt, taking the place of two mounting bolts in common usage. A pair of backing plate mounting bolts generally opposite the anchor pin also secure the backing plate to the flange. The wheel cylinder is retained on the backing plate by a wire clip instead of the commonly used mounting bolts. The brake shoes, springs and other control elements are mounted on the backing plate in the usual manner.

2 Claims, 3 Drawing Figures

WHEEL BRAKE ASSEMBLY

The invention relates to a wheel brake assembly, and more particularly to a drum brake arrangement wherein a thin wall mounting plate having a strength character incapable of taking the brake torque is utilized to mount the brakes shoes and the wheel cylinder. The backing plate is secured to a mounting flange which in turn is fixed to an axle support member such as an axle housing. The anchor pin for the brake shoes is secured to the flange and also acts as a backing plate mounting bolt. This arrangement permits a substantial decrease in brake assembly weight as compared to conventional current production drum brakes of a similar size. The anchor pin is assembled directly to the mounting flange, eliminating torque transfer through the backing plate assembly. This provides for a more precise anchor pin location than is the case when a backing plate is mounted on a support member and the anchor pin is then mounted on the backing plate. This eliminates the provision of a separate reinforcement plate at the anchor pin as well as the use of two mounting bolts which are commonly used generally adjacent the anchor pin to mount the backing plate. By providing the wheel cylinder mounting on the thin backing plate and requiring no torque to be transmitted through the backing plate, a simple wheel cylinder casting can be utilized, with the wheel cylinder being retained on the backing plate with a wire clip instead of the commonly used wheel cylinder mounting bolts. The brake adjusting mechanism, parking brake linkage, brake shoe tie downs, and brake shoe retracting springs are assembled as a part of the brake unit mounted on the backing plate in a manner similar to that in current use. When the brake is used as a front wheel brake, the parking brake mechanism is not required and the mounting flange is secured to a fixed support which may be a part of the steering knuckle or other front axle support.

IN THE DRAWING

Figure 1:
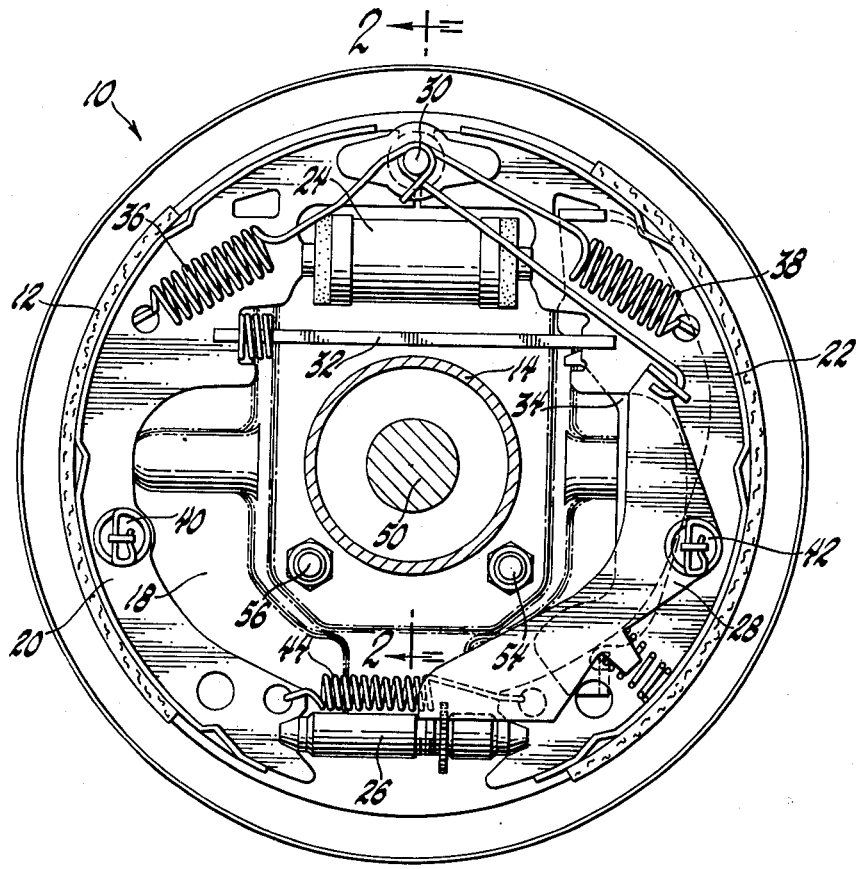
FIG. 1 is an elevation view of a wheel brake assembly embodying the invention with arts in section.
Figure 3:
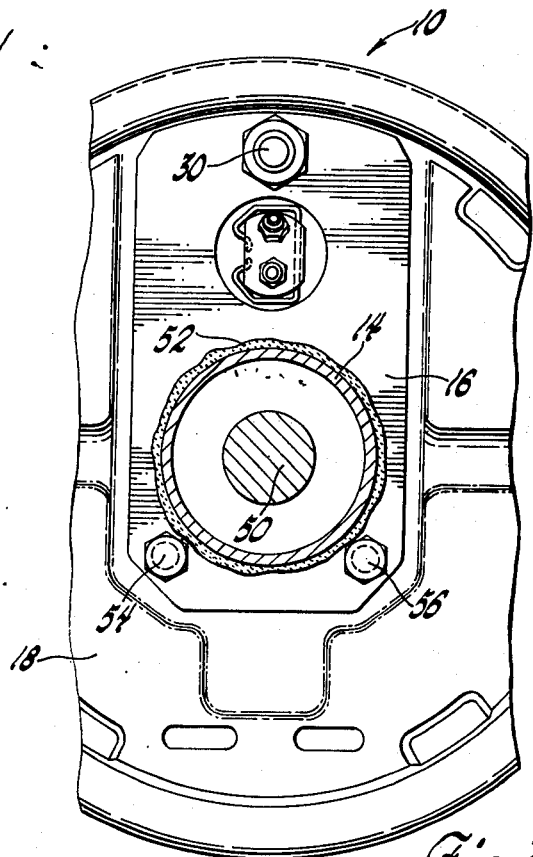
FIG. 3 is an elevation view of the other side of the wheel brake assembly of FIG. 1, taken in the direction of arrows 3—3 of FIG. 2 and having parts broken away and in section.

The wheel brake assembly 10 is illustrated as including a wheel brake unit 12, an axle support member or housing 14, and a wheel brake unit mounting flange 16. The brake drum, which is also a part of the wheel brake assembly, is not illustrated for simplicity. However, the brake drum is provided in a manner well known in the art. FIG. 1 is an outer side view of the wheel brake assembly with the drum removed, while FIG. 3 is an inner side view of the assembly. The wheel brake unit 12 includes a backing plate 18, brake shoes 20 and 22, a wheel cylinder 24 positioned between the upper end of brake shoes 20 and 22, an adjuster screw 26 positioned between the lower ends of the shoes 20 and 22, an adjuster actuating mechanism 28, and an anchor pin 30. If the wheel brake unit is for the vehicle wheels having a parking brake mechanism, it will also include a brake shoe spreader bar 32 and appropriate parking brake linkage 34. The brake shoe retracting springs 36 and 38, the shoe hold down mechanisms 40 and 42, and adjuster screw spring 44 are also parts of the wheel brake unit 12.

Figure 2:
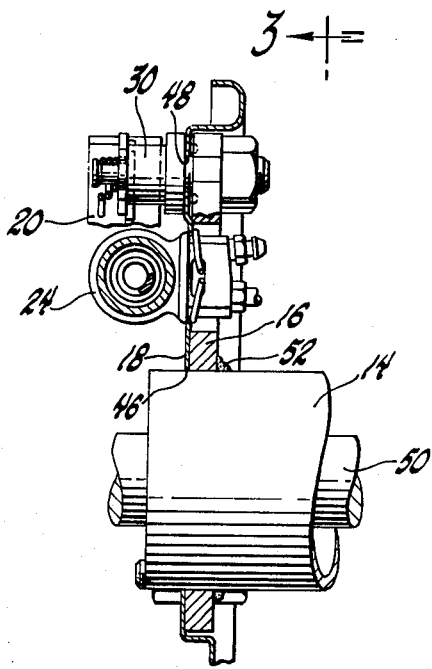
FIG. 2 is a cross section view taken in the direction of arrows 2—2 of FIG. 1 and having parts broken away.

The backing plate 18 has a centrally formed axle-receiving opening 46 and an anchor pin-receiving opening 48 which is positioned radially outward of opening 46. The axle housing or support member 14 extends through opening 46 as shown in FIG. 2. The axle 50, which is a rear axle for the wheel of the particular brake assembly illustrated, is suitably mounted in the housing 14. The mounting flange 16 is secured to axle housing 14 by suitable means such as weld 52. The backing plate 18 is secured to the mounting flange 16 on one side of opening 46 by the anchor pin 30, which thus acts as a backing plate circumferential locating and mounting means. Two mounting bolt assemblies 54 and 56, on the generally opposite side of opening 46 from the anchor pin 30, also fasten the backing plate to the flange.

The brake assembly construction has been found to permit an assembly weight decrease of approximately twenty-five percent as compared to conventional brake assemblies of the same capacity. This results in vehicle weight savings and cost and leads to better fuel economy. It is advantageous to have the anchor pin assembled directly to the mounting flange, eliminating torque transfer through the backing plate assembly. Since the backing plate only needs to support but not take stresses from the wheel cylinder and the brake shoes, its thickness is reduced to approximately half that of conventional backing plates and is a thin wall of material. The arrangement eliminates the anchor pin reinforcement plate otherwise needed, as well as two of four backing plate mounting bolts, nuts and lock washers. A more simple wheel cylinder casting is used, and the wheel cylinder needs only to be mounted for retention. The brake assembly has been found to function as well as conventionally designed brake assemblies.

What is claimed is:

1. A wheel brake assembly comprising:
   a wheel brake unit including
      a backing plate having an axle-receiving opening formed centrally therethrough and being formed of material having a strength characteristic incapable of taking brake torque,
      brake shoes mounted on said backing plate for guided braking movement,
      brake torque-taking means for taking brake torque from said shoes and including an anchor pin extending through an opening in said backing plate radially outward of said axle-receiving opening and providing backing plate circumferential locating and mounting means,
      and a wheel cylinder for braking actuation of said brake shoes, said wheel cylinder having mounting means extending through an opening in said backing plate radially outward of said axle-receiving opening and provided with brake actuating fluid connection and bleed means;
   a wheel axle support member;
   and a brake unit mounting flange fixed to said axle support member against movement under torque, first means securing said brake torque-taking means to said mounting flange and second means securing said wheel cylinder to said backing plate whereby brake torque is transmitted from said brake shoes to said mounting flange to said support member independently of said brake unit bacing plate so that brake torque is not exerted on said backing plate;

said backing plate being mounted on said mounting flange by said anchor pin on one side of said axle-receiving opening and by fastening means on the other side of said axle-receiving opening.

2. A wheel brake assembly comprising:

a wheel brake unit including a thin wall backing plate having an axle-receiving opening formed centrally therethrough, said backing plate being formed of material having insufficient strength to take brake torque due to its thickness but being sufficiently strong to mount and support certain brake elements, brake shoes mounted on said backing plate for guided braking movement, brake torque-taking means for taking brake torque from said shoes and including an anchor pin extending through an opening in said backing plate radially outward of said axle-receiving opening and providing backing plate circumferential locating and mounting means, and a wheel cylinder for braking actuation of said brake shoes; said wheel cylinder having mounting means extending through an opening in said backing plate radially outward of said axle-receiving opening and provided with brake actuating fluid connection and bleed means;

a wheel axle support member;

and a brake unit mounting flange fixed to said axle support member for brake torque transmission thereto, means securing said brake torque-taking means to said mounting flange and said wheel cylinder to said backing plate whereby brake torque is transmitted from said brake shoes to said mounting flange to said support member independently of said brake unit backing plate;

said backing plate being mounted on said mounting flange by said brake torque-taking means and by fastening means circumferentially spaced about said axle-receiving opening to provide at least three circumferentially spaced mounting points for said backing plate.

* * * * *

UNITED STATES PATENT OFFICE
CERTIFICATE OF CORRECTION

Patent No. 4,061,429           Dated December 6, 1977

Inventor(s) Thomas P. Mathues

It is certified that error appears in the above-identified patent and that said Letters Patent are hereby corrected as shown below:

Column 1, line 43, "arts" should read -- parts --.

Column 2, line 67, claim 1, "bacing" should read -- backing --.

Signed and Sealed this

Second Day of May 1978

[SEAL]

Attest:

RUTH C. MASON
Attesting Officer

LUTRELLE F. PARKER
Acting Commissioner of Patents and Trademarks